United States Patent [19]
Fujii

[11] Patent Number: 5,846,148
[45] Date of Patent: Dec. 8, 1998

[54] BICYCLE FRONT DERAILLEUR

[75] Inventor: Kazuhiro Fujii, Sakai, Japan

[73] Assignee: Shimano, Inc., Osaka, Japan

[21] Appl. No.: 914,550

[22] Filed: Aug. 19, 1997

Related U.S. Application Data

[63] Continuation of Ser. No. 689,354, Aug. 7, 1996, abandoned.

[30] Foreign Application Priority Data

Aug. 7, 1995 [JP] Japan ................................. 7-221114

[51] Int. Cl.⁶ ............................................. F16H 59/00
[52] U.S. Cl. .................................................. 474/80
[58] Field of Search ........................ 474/70, 78, 80–82

[56] References Cited

U.S. PATENT DOCUMENTS

| | | | |
|---|---|---|---|
| 4,199,997 | 4/1980 | Isobe | 74/217 B |
| 4,199,998 | 4/1980 | Isobe | 74/217 B |
| 4,330,137 | 5/1982 | Nagano | 280/238 |
| 4,529,395 | 7/1985 | Coue | 474/82 |
| 4,832,667 | 5/1989 | Luren | 474/140 |
| 5,496,222 | 3/1996 | Kojima | 474/80 |

FOREIGN PATENT DOCUMENTS

| 0 653 347 A1 | 5/1995 | European Pat. Off. . |
|---|---|---|
| 3118035 A1 | 2/1982 | Germany . |

*Primary Examiner*—Roger Schoeppel
*Attorney, Agent, or Firm*—James A. Deland

[57] ABSTRACT

A bicycle front derailleur includes a frame bracket for fixing the derailleur to a bicycle frame, a cage plate for guiding a chain among a plurality of chainwheels, and a radial adjustment mechanism for adjusting a position of the cage plate substantially radially relative to the chainwheels. In a more specific embodiment, a derailleur bracket fixes the cage plate to the frame bracket, wherein the derailleur bracket defines a derailleur bracket opening. A bushing is disposed in the derailleur bracket opening. The bushing defines a bushing opening such that the bushing has an eccentric shape relative to the bushing opening. A fastener extends through the bushing opening for fastening the bushing to the frame bracket. Thus, rotation of the bushing varies the position of the derailleur bracket and hence the position of the cage plate relative to the chainwheels.

17 Claims, 5 Drawing Sheets

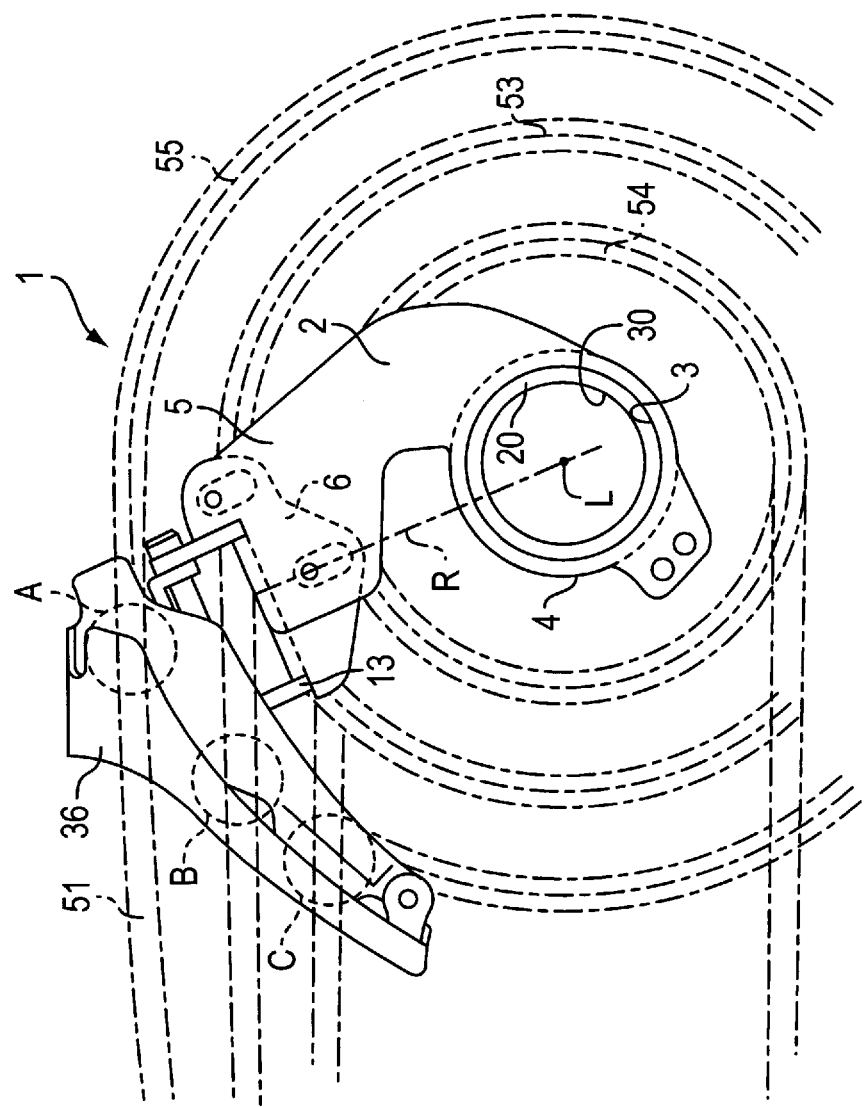

BICYCLE FRONT DERAILLEUR

This is a continuation of application Ser. No. 08/689,354, filed Aug. 7, 1996, now abandoned.

BACKGROUND OF THE INVENTION

The present invention is directed to bicycle derailleurs and, more specifically, to a bicycle front derailleur with an adjusting mechanism for adjusting the position of a cage plate relative to a plurality of chainwheels.

Sports bicycles are usually equipped with front and rear derailleur gear-shift mechanisms. The front derailleur is a mechanism for selecting between double and triple front chainrings on which the chain lies. There are a variety of chainrings, and the number of teeth assembled on them differ. The chainrings are selected at discretion based on the rider's needs, and the position of the front derailleur cage plate is usually adjusted to correspond to the largest selected chainring. More specifically, in conventional front derailleurs a clamp-band unit fastens the cage plate to the seat-tube bracket, and the cage plate is placed into the optimum position by adjusting the position of the clamp-band unit on the bicycle during assembly.

Some front derailleurs are mounted to the bicycle using a non-adjustable bracket that is fixed to the bottom bracket assembly. Thus, multiple bracket configurations must be constructed to position the front derailleur properly for the different large chainwheels that the cyclist may choose. Unfortunately, an increase in front derailleur bracket types leads to an increase in unit cost for the part. The multiple bracket types also complicates management tasks such as storage and delivery.

SUMMARY OF THE INVENTION

The present invention is directed to a front derailleur bracket which incorporates an adjustment mechanism for adjusting a chain cage radially with respect to the chainwheels. As a result, fewer front derailleur brackets may accommodate more chainring configurations.

In one embodiment of the present invention, a bicycle front derailleur includes a frame bracket for fixing the derailleur to a bicycle frame, a cage plate for guiding a chain among a plurality of chainwheels, and a radial adjustment mechanism for adjusting a position of the cage plate substantially radially relative to the chainwheels. In a more specific embodiment, a derailleur bracket fixes the cage plate to the frame bracket, wherein the derailleur bracket defines a derailleur bracket opening. A bushing is disposed in the derailleur bracket opening. The bushing defines a bushing opening such that the bushing has an eccentric shape relative to the bushing opening. A fastener extends through the bushing opening for fastening the bushing to the frame bracket. Rotation of the bushing varies the position of the derailleur bracket and hence the position of the cage plate relative to the chainwheels.

If desired, the derailleur bracket opening and the bushing each may have an oval shape, wherein the derailleur bracket opening has a longitudinal axis which extends radially outwardly from a centerline of the plurality of chainwheels. As a result, the position of the cage plate may be adjusted radially with respect to the chainwheels while maintaining the horizontal attitude of the cage plate.

BRIEF DESCRIPTION OF THE DRAWINGS

FIGS. 1A and 1B are ride views of a particular embodiment of a front derailleur according to the present invention in different adjusted positions;

DETAILED DESCRIPTION OF THE EMBODIMENTS

Figure 1A:
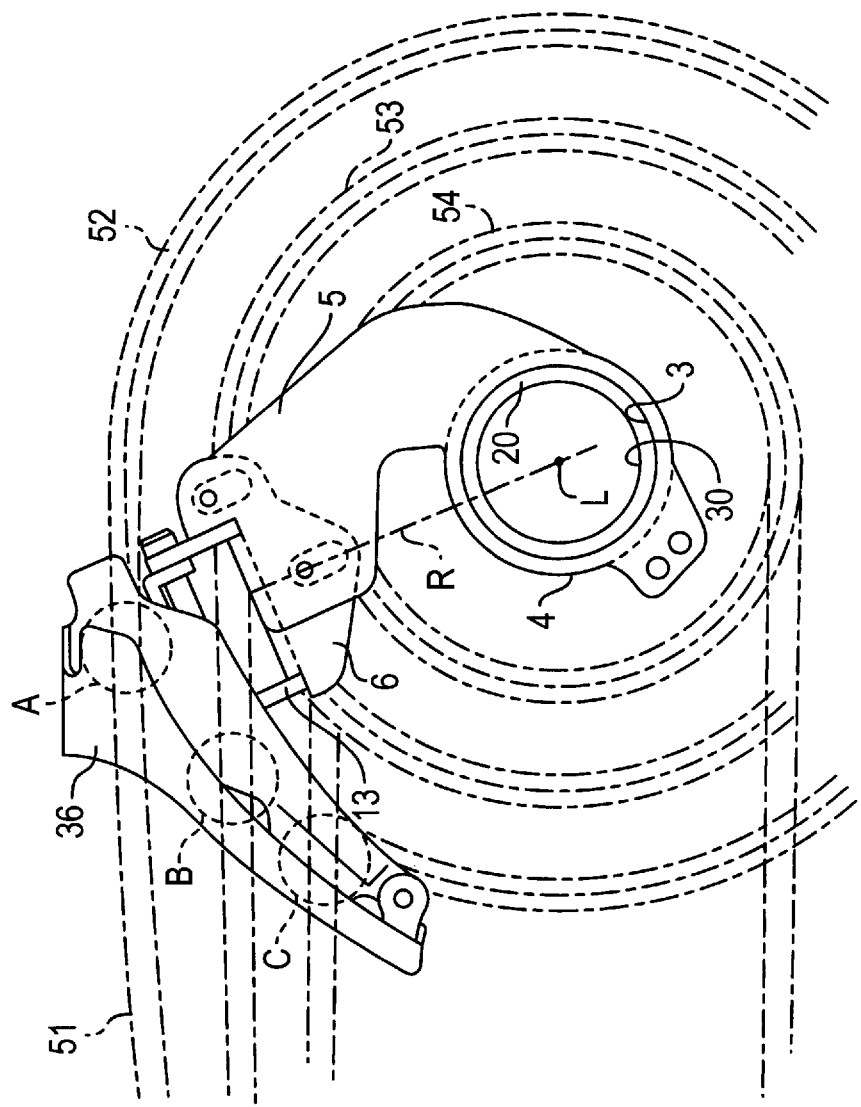

FIGS. 1A and 1B are side views of a particular embodiment of a front derailleur 1 according to the present invention in different adjusted positions. As shown in FIGS. 1A and 1B, a seat-tube bracket 2 is fixed to a bicycle frame bottom bracket 20 in order to install the front derailleur 1 to the bicycle. The seat-tube bracket 2 is fixed coaxially, specifically by means of a nut (not illustrated), to the bicycle frame bottom bracket assembly. The center line of the crank axle which extends from the bottom bracket assembly is indicated by L. The seat-tube bracket 2 is provided with a through hole 3 which aligns with a corresponding opening 30 in the bottom bracket 20.

Figure 2:
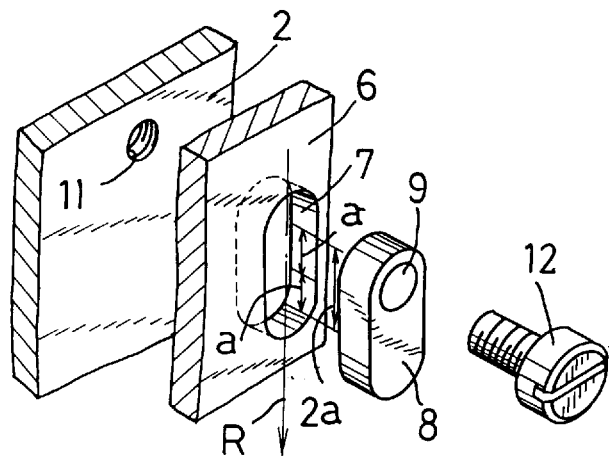
FIG. 2 is an exploded view of a particular embodiment of an adjustment mechanism according to the present invention used with the derailleur shown in FIGS. 1A and 1B.

The seat-tube bracket 2 comprises an axle member 4 and a radial extension member 5 that extends substantially radially as an integral piece with the axle member 4. A front derailleur bracket 6 is fastened to the outer end member of the radial extension member 5. As shown in FIG. 2 which is a view taken from the side of the derailleur opposite the side shown in FIGS 1A and 1B, there is an oval hole 7 in the front derailleur bracket 6. The major-axis direction of the oval hole 7 is a substantially radial direction R relative to a chainring described below. In this embodiment, there are two such oval holes 7 in derailleur bracket 6, and they are oriented parallel to each other.

A bushing 8 is used that fits neatly into the oval hole 7. Bushing 8 can be attached to and detached from the oval hole 7. If both of the oval holes 7 share the same shape, then the bushing 8 can be used for both of the oval holes, lending to convenience. In this embodiment, there is a single bolt-threading hole 9 in the bushing 8, and the bolt-threading hole 9 lies in an orthogonal direction to the major-axis direction of the oval hole 7. Bolt-threading hole 9 is off-center along the major-axis direction of the bushing 8 so that bushing 8 is eccentric relative to bolt-threading hole 9. Screw holes 11 are formed in the seat-tube bracket 2, and a bolt 12 is screwed into the screw hole 11 via the bolt-threading hole 9 of the bushing 8 fitted into the oval hole 7. By reversing the bushing 8 by 180° in the radial direction R and fitting the bushing into the oval hole 7, it is possible to move the remote end of bushing 8 between two vertical positions relative to the bolt-threading hole 9. This, in turn, moves front derailleur bracket 6, and hence cage plate 36, between two vertical positions as shown in FIGS. 1A and 1B.

Figure 3:
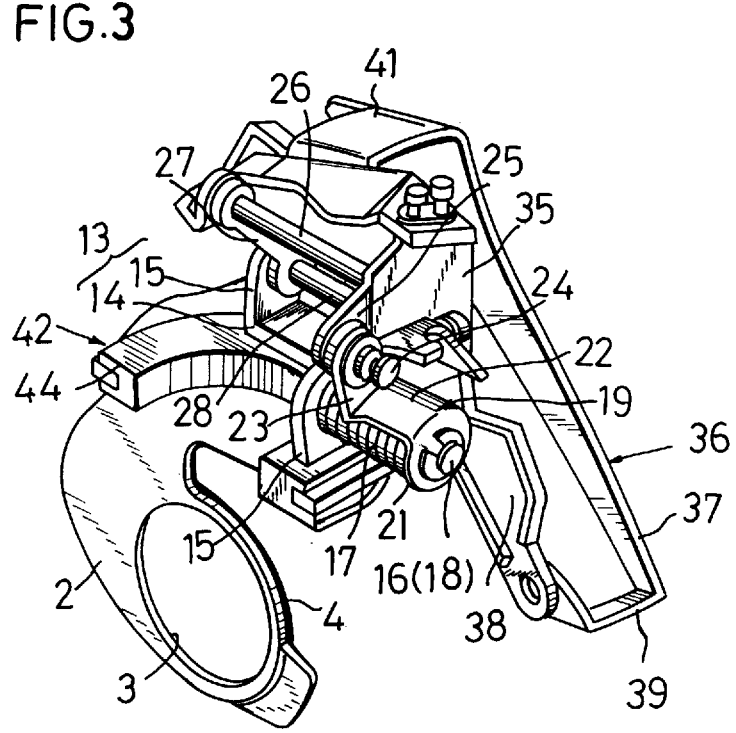
FIG. 3 is a rear oblique view of the front derailleur shown in FIG. 1A and 1B.

The front derailleur bracket 6 is equipped with a link-supporting unit 13, in an integral or assembled manner. As shown in FIG. 3, the link-supporting unit 13 comprises a base component 14 and side-walls 15, which are vertically bent shoulder segments of the base component 14. A first pivot 16, lying parallel to base component 14, is retained by a side-wall 15, and a coil spring 17 has been fitted to the first pivot 16. One end of the coil spring 17 connects to side-wall 15, and a flange 18 is fixed to the other end of the first pivot 16.

A first link 19 is provided between the flange 18 and the end surface of the coil spring 17. The first link 19 comprises a ring member 21 at its end; a planar member 22, which is integrally formed to the ring 21 and extends parallel to the first pivot 16 to the side-wall 15; and a second pivot retainer member 23 which is an integrally bent end section of the planar member 22. A second pivot 24 is provided between the second pivot retainer member 23 and a second link 25. An extension member 35 is provided to the second link 25 as a unified extension continuous with the second link 25. One end of a third pivot 26 is attached to the second link 25, and the other end of third pivot 26 rotatably supports one end of a third link 27. One end of a fourth pivot 28 is attached to the side-wall 15 parallel to the third pivot 26, and the other end of the third link 27 is fixed to this end of fourth pivot 28. The other end of the fourth pivot 28 is rotatably supported by the side-wall 15 protruding upward at one end of the base component 14. The four links (side-wall 15, first link 19, second link 25, third link 27) and the four pivots (first pivot 16, second pivot 24, third pivot 26, fourth pivot 28) comprise a four-link mechanism roughly shaped as a parallelogram.

A cage plate 36 is integrally provided to the extension member 35. The cage plate 36 is substantially a rectangular box, and its top and bottom sides are open. The cage plate 36 comprises a left plate 37, a right plate 38, a front plate 39 and a rear plate 41. The front plate 39 and the rear plate 41 are substantially parallel. A seat-tube support 42 is fixed to the link-supporting unit 13, and the seat-tube support 42 is provided with a semicircular ring member 44 that fits onto the seat tube component of the frame bottom bracket. The front derailleur 1, although supported by means of the seat-tube bracket 2 fixed to the frame bottom bracket, is also supported by the seat tube (not illustrated) of the frame by means of the semicircular ring member 44. A cable anchor member for anchoring one end of a wire is provided to the first link 19.

The operation and action of the embodiment 1 will be described next. As shown in FIG. 1A, a chain 51 passes through the space enclosed by the left plate 37, the right plate 38, the front plate 39, and the rear plate 41. The chain 51 selectively engages with a large diameter chainring 52, a middle diameter chainring 53, or a small diameter chainring 54.

When a gear-shift is executed, the control wire is pulled and the first link 19 turns against the energizing force of the coil spring 17. The cage plate 36, which is integrally connected to the first link 19, moves in the axial direction (the direction perpendicular to the paper when viewing FIGS. 1A and 1B) as a result of the known action of the four-link mechanism. The chain 51, guided in its movement by the axial movement of this cage plate 36, can thus selectively engage the different chainrings due to the known shifting mechanism designed into the configuration of the chainring peripheral surface.

In order to have a suitably positioned area of the cage plate 36 contact the chain 5 1, the cage plate 36 must be properly positioned with respect to the largest chainwheel. However, depending on the type of bicycle and the needs of the rider, the largest chainring varies in its number of teeth, which determines the proportional diameter of the chainring. Thus, when replacing the illustrated largest-diameter chainring 52 with a chainring 55 (FIG. 1B) having a smaller radius, or when installing the smaller chainring 55 from the outset, the cage plate 36 must be radially positioned closer towards the center line L. To accomplish this, the bolt 12 is loosened and removed from the seat-tube bracket 2, and the bushing 8 is removed from the front derailleur bracket 6. The removed bushing 8 is reversed 180° from the position shown in FIG. 1A and fitted back into the oval hole 7 as shown in FIG. 1B. The bolt 12 is screwed into the hole 11, and the front derailleur bracket 6 is again fixed to the seat-tube bracket 2. Although the radial position of the bolt 12 does not change, the radial position of the front derailleur bracket 6 does change as a result of the eccentric shape of bushing 8 relative to hole 9. This radial differential in radial positions is given as distance 2a, where distance "a" is the distance between the center of the oval hole 7 and the center of the bolt-threading hole 9.

It should be apparent that two sizes of chainrings can be accommodated with one type of bushing that has a single bolt-threading hole, four sizes of chainrings can be accommodated by two types of bushings, and so on. Furthermore, a single screw hole 11 can accommodate all the different bushings and positions. As a result, there is greater fixability between the seat-tube bracket 2 and the front derailleur bracket 6.

FIG. 1A shows a contact area A (the region inside the dotted circle) on the cage plate 36 that comes into contact with the chain 51 when shifting from the largest-diameter chainring 52. As shown, contact area A is substantially aligned to the peripheral line of chainring 52. The absolute position of contact area A on the cage plate 36 does not move and the contact area A is a substantially unchanging region. A contact area B related to the chainring 53 is similarly maintained as a substantially unchanging region, and a contact area C related to the chainring 54 is also maintained as a substantially unchanging region.

The contact areas A, B, and C move substantially radially due to the movement of the front derailleur bracket 6 in the major-axis direction of the oval hole 7. In FIGS. 1A and 1B, the direction of the oval hole 7 is the direction in which the cage plate moves as it follows the outer periphery of the chainring 52 in a substantially radial direction. However, in order to optimally equalize the directionality of these three radial movements, the direction from the center point of the axis center line L to the contact area B, which is the intermediate area between the contact areas A and C, could be aligned with the major-axis direction of the oval hole 7. In most cases, however, it is not necessary to adhere strictly to this relationship between the major-axis direction and the radial direction due to the mitigating effects of flexible chains on various types of resistance during gear changes.

The distance 2a in the embodiment described above can be set to accommodate a one-tooth increase (or decrease) in the radial size of the largest diameter chainwheel 52. Alternatively, the distance 2a in the embodiment described above can be set to accommodate a two or more tooth increase (or decrease) in the radial size of the largest diameter chainwheel 52.

Figure 4:
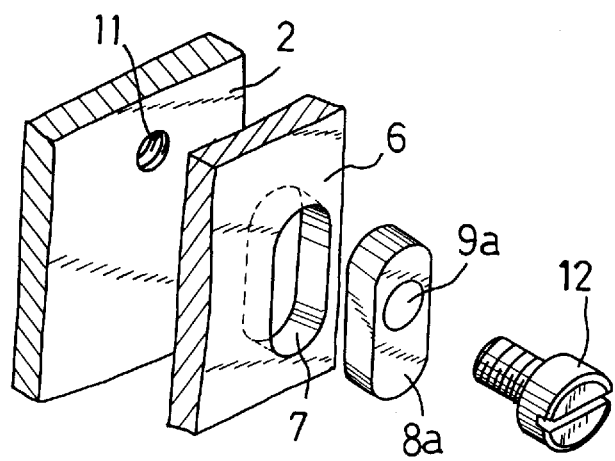
FIG. 4 is an exploded view of an alternative embodiment of an adjustment mechanism according to the present invention used with the derailleur shown in FIGS. 1A and 1B.
Figure 5A:
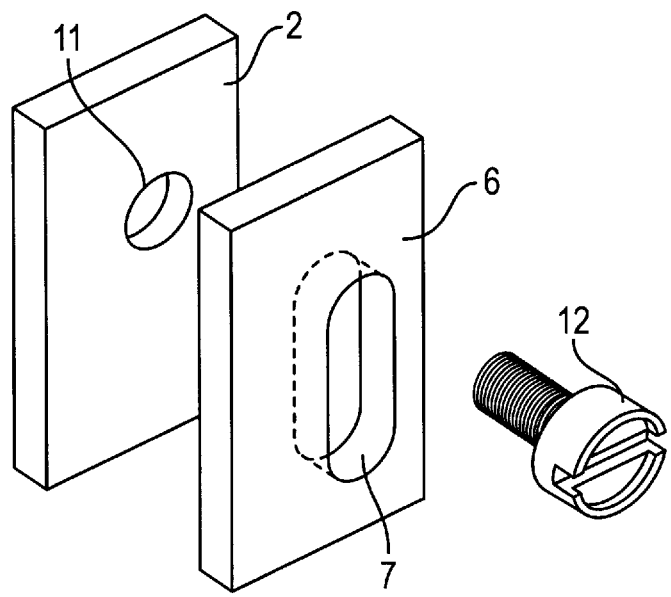
FIGS. 5A and 5B are exploded and assembled views, respectively, of another alternative embodiment of an adjustment mechanism according to the present invention used with the derailleur shown in FIGS. 1A and 1B.
Figure 5B:
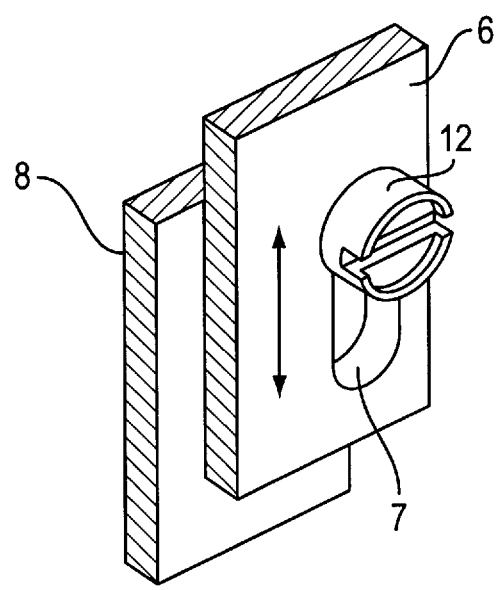

While the above is a description of various embodiments of the present invention, further modifications may be employed without departing from the spirit and scope of the present invention. For example, the hole 9 in bushing 8 need not be located exactly as shown in FIG. 2. As shown in FIG. 4, the eccentric distance of the bolt-threading hole 9 of the bushing 8 can be small to produce a smaller distance differential, if desired. Fixing the bolt 12 by passing it through the oval hole 7 without the use of a bushing will reduce the fixability between the seat-tube bracket 2 and the front derailleur bracket 6 as compared to the fixability in the example above, but employment of a bushing is not essential. If a bushing having a single bolt-threading hole is employed, then the cage plate 36 can be moved radially on a discrete basis. If a bushing is not employed, as shown in FIGS. 5A and 5B, then the cage plate 36 can be moved radially on a continuous basis.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle front derailleur comprising:
   a frame bracket (2) for fixing the derailleur to a bicycle frame, wherein the frame bracket includes an opening (3) that aligns with an opening (30) in a bottom bracket (20) when the frame bracket (2) is mounted to the bicycle frame;
   a cage plate (36) for guiding a chain (51) among a plurality of chainwheels (52, 53, 54); and
   radial adjustment means (7, 8, 11, 12) for adjusting a position of the cage plate (36) substantially radially relative to the chainwheels (52, 53, 54).

2. The derailleur according to claim 1 wherein the radial adjustment means (7, 8, 11, 12) maintains a horizontal attitude of the cage plate (36) as the position of the cage plate (36) is adjusted.

3. The derailleur according to claim 1 further comprising a derailleur bracket (6) for fixing the cage plate (36) to the frame bracket (2), and wherein the radial adjustment means (7, 8, 11, 12) adjusts the position of the derailleur bracket (6) relative to the frame bracket (2).

4. The derailleur according to claim 1 wherein the radial adjustment means (7, 8, 11, 12) has a range of adjustment of the position of the cage plate (36) approximately equal to a one tooth increase in radial size of the chainwheel (52) having the largest number of teeth from among the plurality of chainwheels (52, 53, 54).

5. The derailleur according to claim 1 wherein the radial adjustment means (7, 8, 11, 12) has a range of adjustment of the position of the cage plate (36) approximately equal to a two or more tooth increase in radial size of the chainwheel (52) having the largest number of teeth from among the plurality of chainwheels (52, 53, 54).

6. The derailleur according to claim 1 wherein the radial adjustment means (7, 8, 11, 12) is structured to adjust the position of the cage plate (36) in discrete increments.

7. The derailleur according to claim 1 wherein the radial adjustment means (7, 8, 11, 12) is structured to adjust the position of the cage plate (36) in continuous increments.

8. The derailleur according to claim 1 wherein the frame bracket (2) is structured to fit to a seat tube of the bicycle.

9. The derailleur according to claim 1 further comprising a four-link mechanism (15, 16, 19, 24, 25, 26, 27, 28) coupling the cage plate (36) to the derailleur bracket (6).

10. A bicycle front derailleur comprising:
    a frame bracket (2) for fixing the derailleur to a bicycle frame;
    a cage plate (36) for guiding a chain (51) among a plurality of chainwheels (52, 53, 54);
    radial adjustment means (7, 8, 11, 12) for adjusting a position of the cage plate (36) substantially radially relative to the chainwheels (52, 53, 54);
    wherein the radial adjustment means (7, 8, 11, 12) comprises a bushing (8) which is movable for adjusting the position of the cage plate (36).

11. The derailleur according to claim 10 wherein the bushing (8) is movable to a plurality of discrete positions.

12. The derailleur according to claim 11 wherein the bushing (8) is movable to two positions.

13. The derailleur according to claim 10 wherein the bushing (8) is disposed in an oval-shaped opening (7) having a longitudinal axis (R) which extends radially outwardly from a centerline (L) of the plurality of chainwheels (52, 53, 54) when the derailleur is mounted to the frame.

14. The derailleur according to claim 10 wherein the bushing (8) defines an opening (9) such that the bushing (8) has an eccentric shape relative to the opening (9).

15. A bicycle front derailleur comprising:
    a frame bracket (2) for fixing the derailleur to a bicycle frame;
    a cage plate (36) for guiding a chain (51) among a plurality of chainwheels (52, 53, 54);
    a derailleur bracket (6) for fixing the cage plate (36) to the frame bracket (2);
    radial adjustment means (7, 8, 11, 12) for adjusting a position of the cage plate (36) substantially radially relative to the chainwheels (52, 53, 54), wherein the radial adjustment means (8, 11, 12) comprises:
    a bushing (8) disposed in the derailleur bracket opening (7) and defining a bushing opening (9) such that the bushing (8) has an eccentric shape relative to the bushing opening (9); and
    a fastener extending through the bushing opening for fastening the bushing to the frame bracket (2).

16. The derailleur according to claim 15 wherein the derailleur bracket opening (7) and the bushing (8) each have an oval shape.

17. The derailleur according to claim 16 wherein the derailleur bracket opening (7) has a longitudinal axis (R) which extends radially outwardly from a centerline (L) of the plurality of chainwheels (52, 53, 54) when the derailleur is mounted to the frame.

* * * * *